(No Model.)

H. F. JULIAN.
WHEEL FOR VEHICLES.

No. 604,154. Patented May 17, 1898.

WITNESSES.
John Buckler
C. Gerst

INVENTOR
Henry Forbes Julian.
BY
Edgar Tate & Co.
ATTORNEYS.

UNITED STATES PATENT OFFICE.

HENRY FORBES JULIAN, OF TEIGNMOUTH, ENGLAND.

WHEEL FOR VEHICLES.

SPECIFICATION forming part of Letters Patent No. 604,154, dated May 17, 1898.

Application filed July 6, 1897. Serial No. 643,591. (No model.)

*To all whom it may concern:*

Be it known that I, HENRY FORBES JULIAN, a subject of the Queen of Great Britain, residing at Teignmouth, in the county of Devon, England, have invented certain new and useful Improvements in Wheels for Vehicles, of which the following is a full and complete specification, such as will enable those skilled in the art to which it appertains to make and use the same.

This invention relates to improvements in the wheels of vehicles, and is particularly applicable to such wheels as are used on bicycles; but it may also be applied to the wheels of road-carriages and other like vehicles; and the object thereof is to secure greater ease to riders or occupants of the vehicle, greater durability, readier facilities for repairs, and less liability to slip sidewise than heretofore.

The principal feature of this invention may be said to consist in closing and securing the joint or split of an inflated tire by means of an independent inflated tube covering the said joint and forming a portion of the rim of the wheel independent of its air-pressure of inflation.

Heretofore it has been usual to employ a tube inside the tire in order that the said tire may be inflated or otherwise to depend on the pressure of air within the tire itself in order to secure the said tire to the wheel. In both methods the security of the tire depends wholly or partly on its inflation and when deflated cannot be used without danger of detachment from the rim or injury to the inflated tube or tire. I have now discovered a method by which the tire may be inflated without the use of the said tube and may be secured to the wheel quite independent of the pressure inflating the tire and by which the tire can be used after deflation with little or no danger of injury.

The invention is fully disclosed in the following specification, of which the accompanying drawings form a part, in which—

Figure 1:
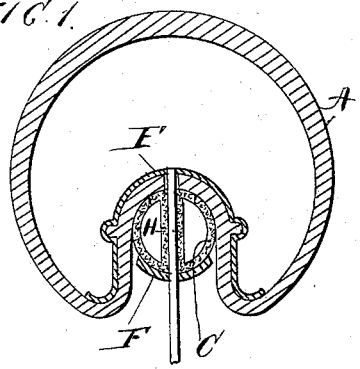

Figure 1 represents a cross-section of the rim and tire of a wheel made according to my invention, and Figs. 2, 3, 4, 5, and 6 similar views of modified forms of construction.

Figure 2:
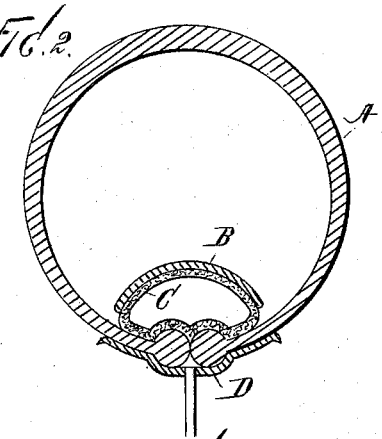
Figure 3:
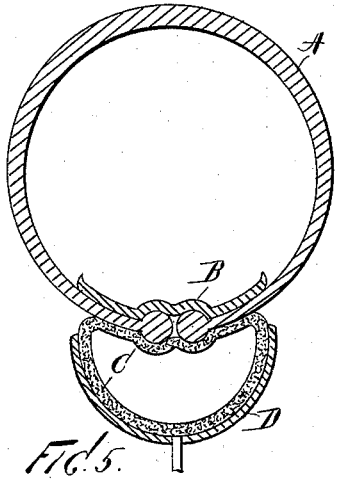
Figure 4:
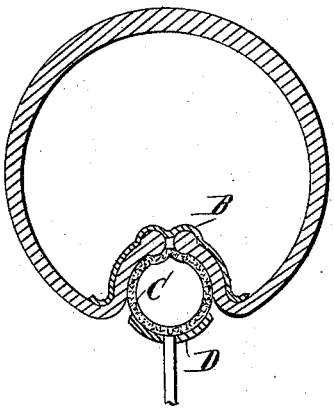
Figure 5:
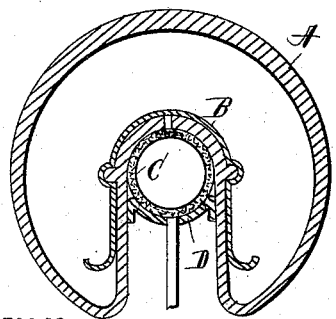

In the drawings forming part of this specification the separate parts of my improvement are designated by the same letters of reference in each of the views, and in said drawings A is a cross-section of a tubular tire which may be formed with a cavity around its inner circumference—that is, the circumference facing or on the side of the hub of the wheel—as shown in Figs. 1, 4, 5, and 6, or it may be formed without the cavity, as in Figs. 2 and 3.

B is a loose ring of metal, wood, or other like material. C is an inflated tube of rubber and canvas or other flexible material, and D is a ring attached to the spokes, of metal, wood, or other rigid material. The three parts B, C, and D form together the rim of the wheel.

The tubular tire A is split on its inner circumference in order to be able to open it and get at its inside for the purpose of facilitating the closing of punctures and repairs generally. This split is closed to make the tire air-tight and at the same time to secure it to the rim by placing a flexible tube C and the edges of the tire A between a non-contractible ring D and a non-extensible ring B and then inflating the tube C with air or other suitable fluid to a high pressure. The tube C passes the whole way around the split, forming a ring, and when inflated the pressure becomes equally distributed over the said joint or split or against the edges of the tire, making an air-tight tube of the said tire and by the same operation securing it to the wheel. The tube C thus covers or fills up the gap between the edges of the split and may be applied at the exterior or interior of the tire. The tube C should be capable of completely filling the space into which it is inserted in order to allow it to press tightly over the joint when inflated. The tube C may be connected with any ordinary inflation-valve passing through the ring D and inflated in the usual way of inflating tires. The tire may be inflated by attaching an inflation-valve to the ring B and passing it through radial tubes in C and thence through D. This radial tube may be of the same material as C.

The manner of attaching the tire to the wheel is as follows: The tube C being deflated and the valve open, the edges of the tire are easily inserted into their places between the tube C and the rings B and D, according as the tube is applied to the inside or outside of the tire. The tube C is then inflated until it reaches a pressure of twenty-five to one hundred pounds, more or less, per square inch, when it will be found to have made an air-tight tube of the tire and at the same time to have secured it to the wheel. The tire is next inflated to any desired pressure of, say, ten to sixty pounds per square inch, according to the purpose for which it is required.

The tire is preferably made of rubber and canvas or other fibrous material; but it may be made of any other suitable material, and at the edges or near the edges of the split the material may be thickened, or ribs or projections may be formed to more firmly secure the tire to the rim, and these projections may fit into corresponding hollows in the rings of the rim and may also press into the tube C, as shown in the various figures. These projections may be of rubber or rubber and canvas, twine, rope, or metal or other suitable material. They may be extensible or non-extensible, contractible or non-contractible, as found most desirable and according to the form selected and the purpose for which the tire is to be used.

The tire may have its two edges curved inward toward its cross-sectional center, forming a cavity at its inner circumference, and within this cavity the joint or split is closed and secured by means of the inflated tube C. This enables the lower portion of the tire at its inner circumference to become contracted, as in Fig. 2, and thus allows the rim to swing slightly or move laterally without altering the normal position of the tread of the tire on the ground, whereby the risk of side slip when turning the wheel on a curve is greatly diminished; also, the rim of the wheel, forming an elastic cushion independent of the tire, gives greater ease to riders or occupants of the vehicle than when the rim is of rigid material.

In some cases it is preferable to employ the tire without a cavity, or the edges of the tire may be made to project outward toward the center of the wheel, as shown in Figs. 2 and 3.

The tube C may be applied to cover the joint or split on the outside or inside of the tire, as found desirable.

It is obvious that the tube C may have the side or part which is not in contact with the tire of a non-extensible or non-contractible material, and thus act as if supported against a non-extensible or non-contractible ring.

The tire may be stiffened at any part by attaching to or within the material layers of canvas, twine, rope, metal, or other strong material to prevent stretching or contracting of any part or parts of its circumference in order to give any desired cross-sectional shape to the tire when inflated.

The tire may be inflated with air or any other suitable fluid, and it may also contain solid elastic material—such as cork, fiber, rubber, and the like—in order that the tire may be more safely used after puncture or injury or without inflating. The tube C may be inflated with air or other suitable fluid.

For convenience the rings B and D may be attached to the tube C by cementing or otherwise, or may simply be held in position by the pressure of the tube C, and also one edge of the tire may be detachable, while the other edge is cemented or otherwise secured.

Figure 6:
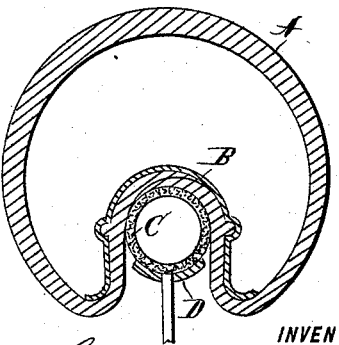

The edges of the tire may be made to lap one over the other and may be scarfed, as shown in Fig. 6, or may be made to meet or nearly meet, as in Figs. 2, 3, 4, 5, and 6, or may be brought within any suitable distance of each other.

In Fig. 1, which represents a modification of this invention, the spokes are attached to the ring E, which is inside the tire A, while the ring F on the outside may be loose or may be also attached to the spokes. The inflated tube C is shown in this case with radial tubes H intersecting it at intervals for the spokes to pass through. The tube C may be formed in one, two, or more parts.

In all cases the inflated tire A is shown without a separate inner inflating-tube, such as is in common use, as I find this tube unnecessary. It may, however, be employed without altering this invention, and may be in one continuous piece, or may be divided into any number of parallel tubes or segmental parts.

The tubular tire A may be protected by covering its tread and sides with a shield or tire, of suitable cross-section, of iron, steel, or other suitable material.

Having fully described my invention, I claim as new and desire to secure by Letters Patent—

1. In a wheel for vehicles, the combination with the rim of a wheel, of a split tire, a non-contractible ring adapted to receive the edges of the split tire and a tube seated between the said edges and the said rim, whereby by the inflation of said tube, the various parts are retained in the proper relative position, substantially as described.

2. In a wheel for vehicles, the combination with the rim of a wheel, of a split tire, a non-contractible ring adapted to receive the edges of the split tire and a tube seated between the said edges and the said rim, whereby, by the inflation of said tubes the various parts are retained in the proper relative position, said ring being provided with recesses in the inner surface thereof, substantially as described.

In testimony that I claim the foregoing as my invention I have signed my name, in presence of the subscribing witnesses, this 19th day of June, 1897.

HENRY FORBES JULIAN.

Witnesses:
AMY FOSTER PEDLEY,
ANNIE HEATH.